United States Patent Office.

JUDSON N. KNAPP, OF SYRACUSE, NEW YORK.

Letters Patent No. 94,897, dated September 14, 1869.

IMPROVED BLACKING FOR HARNESS-LEATHER, &c.

The Schedule referred to in these Letters Patent and making part of the same.

*To all whom it may concern:*

Be it known that I, JUDSON N. KNAPP, of Syracuse, in the county of Onondaga, and State of New York, have invented a new and improved Blacking for Harness-Leather, &c.; and I do hereby declare the following to be a full, clear, and exact description thereof, which will enable those skilled in the art to make and use the same.

The following is a list of the ingredients used, and their relative proportions:

Ten quarts of neat's-foot oil;
Five quarts of molasses;
One hundred pounds of Castile soap;
Ten pounds of gum Senegal;
Two and one-half pounds of spermaceti or stearine;
Five pounds of beeswax; and
Ten pounds of lamp-black.

These ingredients are compounded or incorporated with each other, by dissolving the gum Senegal in water, so as to mix freely with the other ingredients; and by melting the spermaceti and wax in the oil, then adding the coloring-matter or lamp-black, and stirring these together.

The soap is then dissolved in hot water, and boiled until brought to a gummy consistency, when it is added to the mixture, with the molasses, and the whole well beaten together.

The gum gives body and durability to the blacking, and the spermaceti adds to the lustre of the compound and causes the leather to retain its flexibility longer. The wax fills the pores of the leather, so that the more volatile portions of the mixture are retained in the leather, and gives smoothness of finish.

The molasses can be omitted, but it gives body and lustre to the mixture.

The relative proportions of the ingredients may be varied somewhat, but the proportions given are those that I have found to give the best results.

This combination of ingredients gives a fine and brilliant dressing, and preserves the leather in a soft and flexible state.

Having thus described my invention,
What I claim as new, and desire to secure by Letters Patent, is—

A blacking-compound, composed of the within ingredients, in about the proportions mentioned, substantially as set forth.

The above specification of my invention signed by me, this 24th day of August, 1869.

JUDSON N. KNAPP.

Witnesses:
F. A. MORLEY,
E. S. DAWSON.